(12) United States Patent
Wohlert

(10) Patent No.: US 8,618,927 B2
(45) Date of Patent: Dec. 31, 2013

(54) METHODS, SYSTEMS, AND PRODUCTS FOR NOTIFICATIONS IN SECURITY SYSTEMS

(75) Inventor: Randolph Wohlert, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 212 days.

(21) Appl. No.: 13/216,463

(22) Filed: Aug. 24, 2011

(65) Prior Publication Data

US 2013/0049950 A1   Feb. 28, 2013

(51) Int. Cl.
*G08B 1/00* (2006.01)

(52) U.S. Cl.
USPC .......................................... 340/531

(58) Field of Classification Search
USPC ............... 340/531, 506, 539.16, 541, 309.16; 705/1
See application file for complete search history.

(56) References Cited

U.S. PATENT DOCUMENTS

| | | | |
|---|---|---|---|
| 7,046,140 B2 | 5/2006 | Adamczyk et al. | |
| 7,113,090 B1 | 9/2006 | Saylor et al. | |
| 7,554,445 B2 | 6/2009 | Script et al. | |
| 7,786,858 B2 | 8/2010 | Whillock | |
| 2002/0042846 A1 | 4/2002 | Bottan et al. | |
| 2002/0094111 A1* | 7/2002 | Puchek et al. | 382/115 |
| 2002/0120310 A1 | 8/2002 | Linden et al. | |
| 2002/0177428 A1 | 11/2002 | Menard et al. | |
| 2003/0117280 A1* | 6/2003 | Prehn | 340/540 |
| 2005/0151642 A1* | 7/2005 | Tupler et al. | 340/539.18 |
| 2006/0183460 A1* | 8/2006 | Srinivasan et al. | 455/410 |
| 2009/0047923 A1 | 2/2009 | Jain et al. | |
| 2010/0029302 A1 | 2/2010 | Lee et al. | |
| 2010/0295656 A1 | 11/2010 | Herickhoff et al. | |
| 2011/0066036 A1 | 3/2011 | Zilca et al. | |
| 2011/0090334 A1 | 4/2011 | Hicks, III et al. | |

* cited by examiner

*Primary Examiner* — Phung Nguyen
(74) *Attorney, Agent, or Firm* — Scott P. Zimmerman, PLLC

(57) ABSTRACT

Methods, systems, and products are disclosed for notification of alarms in security systems. When an alarm is detected, a contact list is retrieved and a presence database is queried. A location and availability is retrieved for each contact address in the contact list. A contact address is selected in a vicinity of the security system and having the availability to receive an electronic notification. The electronic notification is sent to the contact address to alert of the alarm.

17 Claims, 14 Drawing Sheets

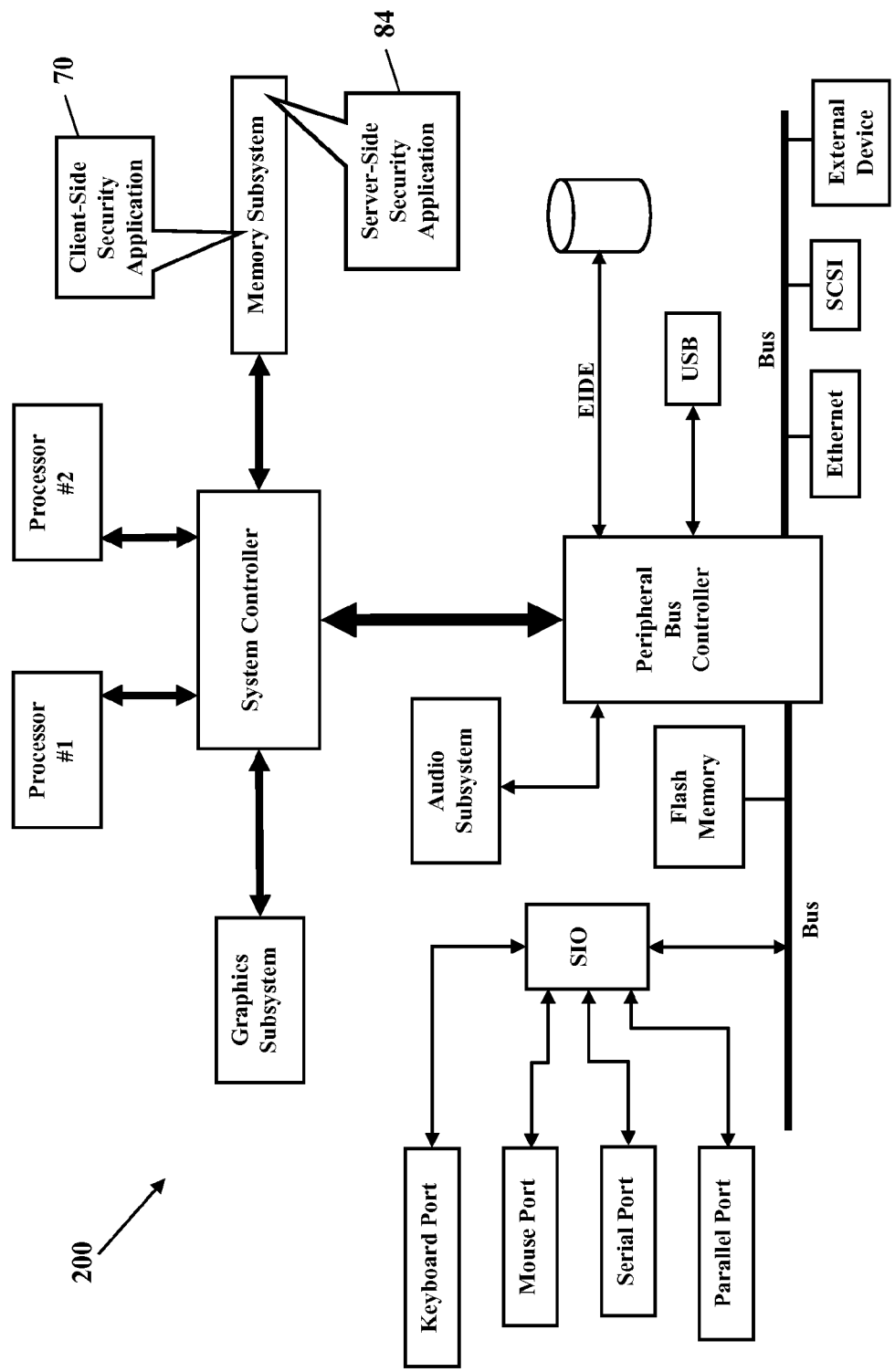

METHODS, SYSTEMS, AND PRODUCTS FOR NOTIFICATIONS IN SECURITY SYSTEMS

BACKGROUND

Exemplary embodiments generally relate to communications and, more particularly, to monitoring of alarm systems, to sensing conditions, to location monitoring, and to condition responsive systems.

Home security systems have long been used to protect homes. Some home security systems even alert a cell phone with an alarm is detected. A text or email message, for example, may be sent to the subscriber's cell phone, and the message describes the alarm. Cell phone alerts, though, are often ineffective. If the cell phone is turned off, out of radio coverage, or forgotten, the security alert is useless. Crucial security alerts, then, go unheeded.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 14 is a schematic illustrating a generic block diagram of a processor-controlled device, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Functional components may be combined in various and/or different physical embodiments and implementations. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
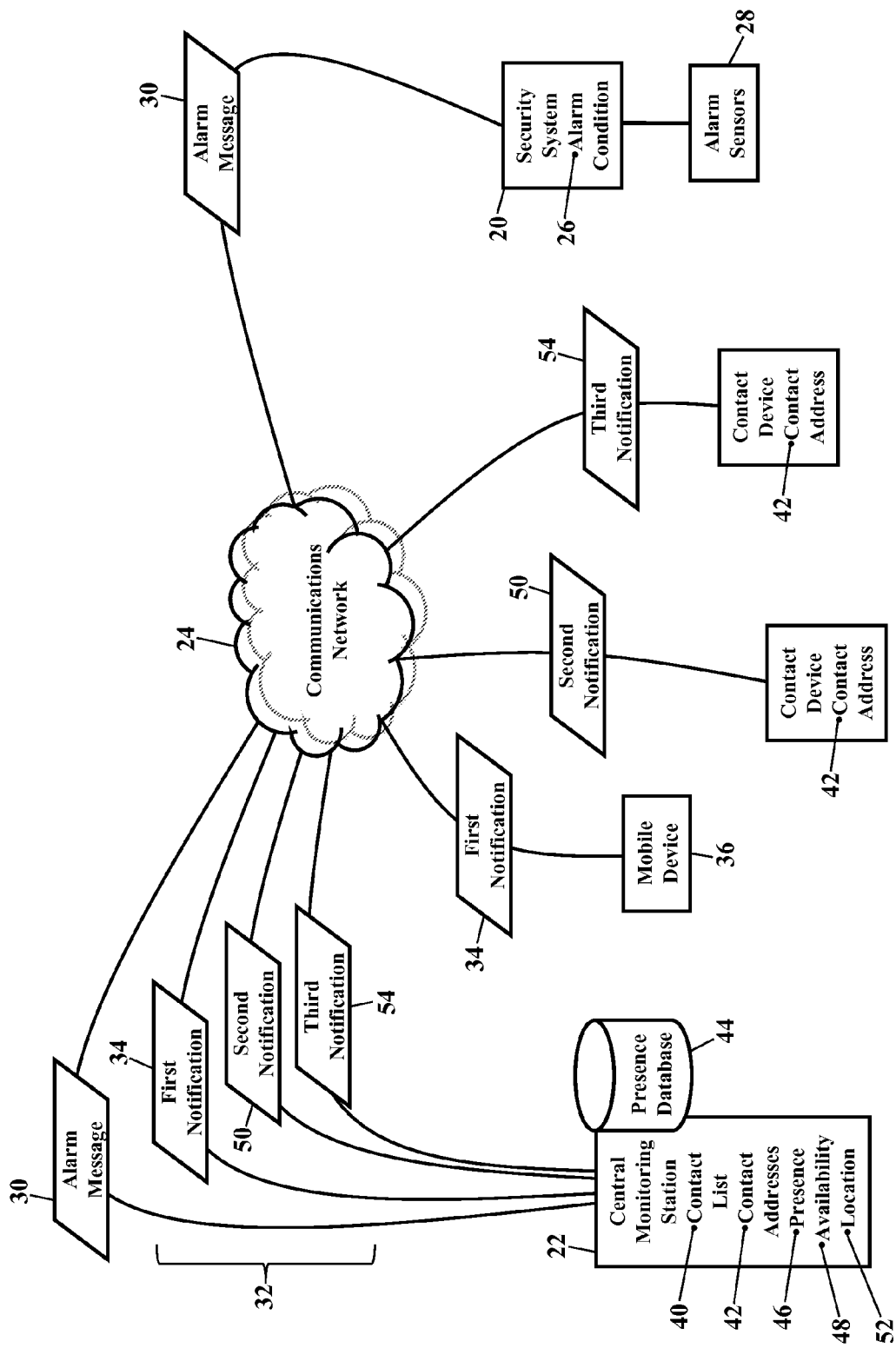
FIG. 1 is a simplified schematic illustrating an operating environment in which exemplary embodiments may be implemented.

FIG. 1 is a simplified schematic illustrating an operating environment in which exemplary embodiments may be implemented. A security system 20 communicates with a central monitoring station 22 via a communications network 24. The security system 20 detects an alarm condition 26 from one or more alarm sensors 28. As those of ordinary skill in the art understand, the alarm sensors 28 monitor for heat, smoke, motion, sound, or any other physical or logical parameter that may indicate a security event. When the security system 20 detects the alarm condition 26 from one or more of the alarm sensors 28, the security system 20 sends an alarm message 30 to the central monitoring station 22. When the central monitoring station 22 receives the alarm message 30, the central monitoring station 22 may then send one or more notifications 32. A first notification 34, for example, may be sent a mobile device 36 (such as a cell phone, smart phone, or personal data assistant).

If the mobile device 36 fails to respond, other notifications 32 may be sent. The central monitoring station 22 may retrieve a contact list 40. The contact list 40 stores or maintains contact addresses 42 that should be contacted when the mobile device 36 fails to respond to the first notification 34. The central monitoring station 22, for example, may query a presence database 44 for a presence 46 and an availability 48 of any contact address 42 in the contact list 40. The central monitoring station 22 may then send one or more second notifications 50 to the contact address 42 (associated with a contact device) in the contact list 40 that is available to receive electronic notifications. The second notification 50 allows a user at the contact address 42 to remotely resolve the alarm condition 26. The user, for example, may electronically cancel, reset, or otherwise resolve the alarm condition 26 detected by the security system 20.

Sometimes, however, physical entry is required. Some alarm conditions 26 may only be resolved by physical entry into a home or business. If the alarm condition 26 cannot be remotely resolved, then physical entry may be required. Here, then, the central monitoring station 22 may query the presence database 44 for any contact address 42 in the contact list 40 having a location 52 in a vicinity of the security system 20. The presence database 44, for example, may be queried for a physical address associated with the security system 20. The presence database 44 responds with any contact addresses 42 in the contact list 40 having a current location 52 in a geographic vicinity of the security system 20. The presence database 44 may even filter out any contact addresses 42 not available (e.g., not accepting messages or lacking capability) to receive notifications. The central monitoring station 22 may then send one or more third notifications 54 to a close contact address 42 in the geographic vicinity of the security system 20. The third notification 54 provides instructions for physically entering the home or business and for resolving the alarm condition 26 (as later paragraphs will explain). Instructions, however, may also be included in or with the first notification 34 and/or the second notification 50. The first notification 34 and/or the second notification 50 may include the instructions for physically entering the home or business and for resolving the alarm condition 26.

Any notifications may be broadcast to multiple recipients. When any of the first notification 34, the second notification 50, or the third notification 54 are sent, the notifications 32 may be simultaneously, or nearly simultaneously, broadcast to multiple recipients and multiple contact address 42. If a response is received from any contact address, exemplary embodiments may stop sending the notifications 32. Exemplary embodiments may also notify the recipients that a response has been received and thanking them for their help.

Figure 2:
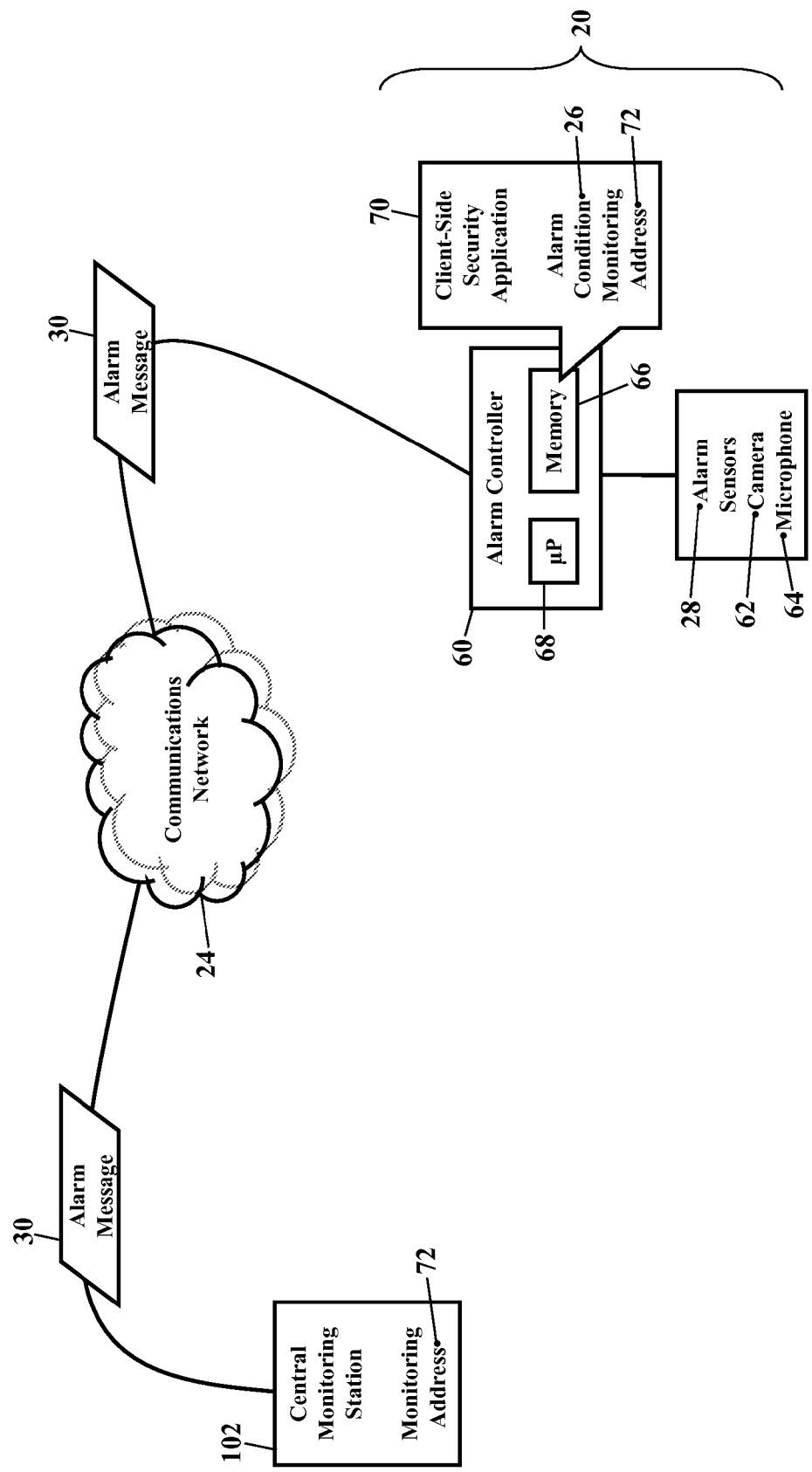
FIG. 2 is a more detailed schematic illustrating a security system, according to exemplary embodiments.

FIG. 2 is a more detailed schematic illustrating the security system 20, according to exemplary embodiments. The security system 20 has an alarm controller 60 that receives inputs from the alarm sensors 28. The alarm controller 60 may also interface with one or more cameras 62 that capture video data and microphones 64 that capture audio data. The cameras 62 and microphones 64 may capture video and/or audio data that is stored in memory 66.

The security system 20 may be processor-controlled. As FIG. 2 illustrates, the security system 20 may include a processor 68 (e.g., "µP"), application specific integrated circuit (ASIC), or other component that executes a client-side security application 70 stored in the memory 66. The client-side security application 70 monitors the inputs, status, or state of the alarm sensors 28, the cameras 62, and/or the microphones 64. When the client-side security application 70 detects the alarm condition 26, the client-side security application 70 instructs the processor 68 to retrieve a monitoring address 72 from the memory 124. The monitoring address 72 is a network communications address at which the central monitoring station 22 receives packetized alarm messages from customers/subscribers of an alarm monitoring service.

The client-side security application 70 then generates the alarm message 30. The alarm message 30 includes data that identifies a network address associated with the security system 20 and/or the alarm controller 60. The alarm message 30 may also include data that describes the alarm condition 26, such as an alarm code associated with the sensor 28. The alarm message 30 may also include information describing the customer and/or the customer's physical street address. Indeed, the alarm message 30 may contain a rich variety of multimedia content, including but not limited to text, video, and audio content. Whatever data is included in the alarm message 30, the data may be packetized according to a packet protocol. Once the alarm message 30 is formatted and ready, the processor 68 sends the alarm message 30 to the monitoring address 72 associated with the central monitoring station 22.

Figure 3:
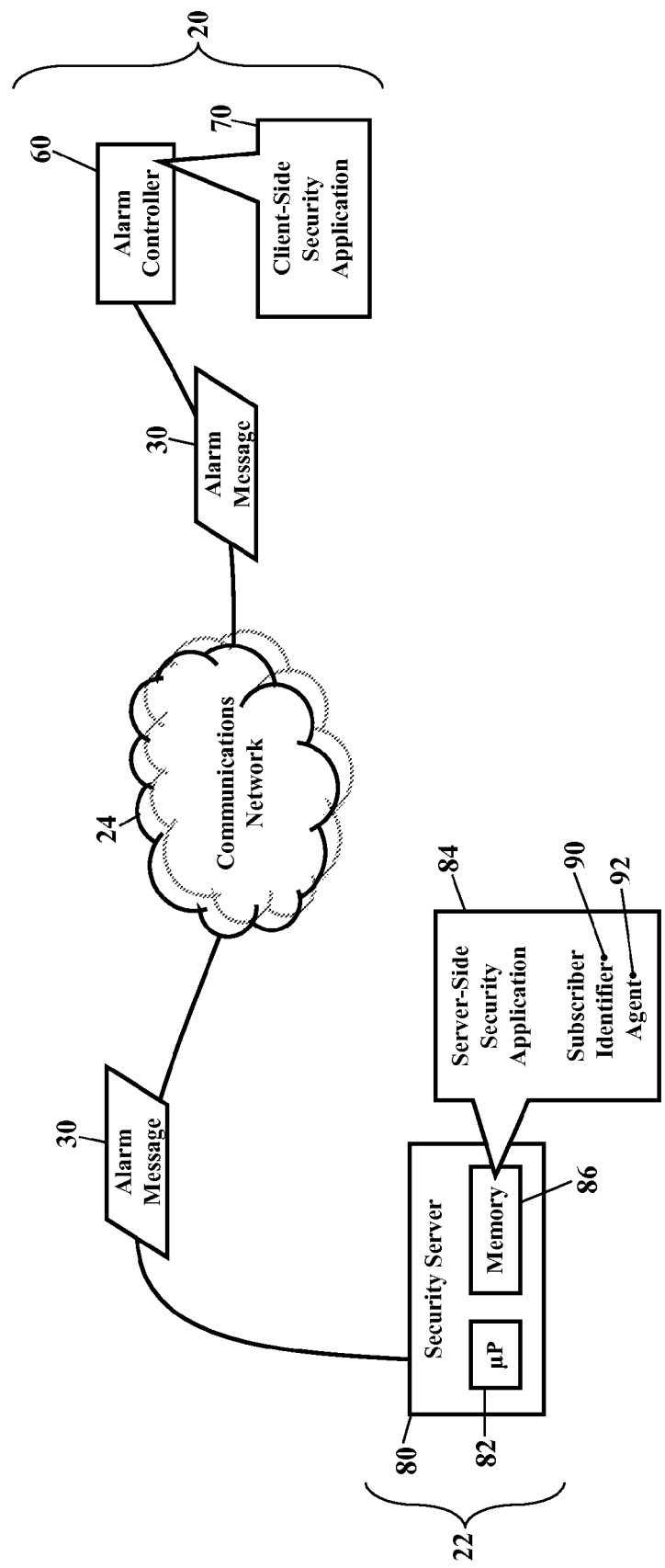
FIG. 3 is a detailed schematic illustrating receipt of an alarm message, according to exemplary embodiments.

FIG. 3 is a detailed schematic illustrating receipt of the alarm message 30, according to exemplary embodiments. The alarm message 30 routes from the alarm controller 60, through the communications network 24, and to a security server 80 at the central monitoring station 22. The security server 80 has a processor 82 (e.g., "µP"), application specific integrated circuit (ASIC), or other component that executes a server-side security application 84 stored in a memory 86. The server-side security application 84 and the client-side security application 70 cooperate in a client-server environment to notify of alarms from the security system 20.

When the security server 80 receives the alarm message 30, the server-side security application 84 obtains any data associated with the alarm message 30. The server-side security application 84, for example, retrieves a subscriber identifier 90 associated with the security system 20 and/or the alarm controller 60. The subscriber identifier 90, for example, may be extracted from one or more header portions and/or payload portions of the packetized alarm message 30. The subscriber identifier 90 is typically a uniquely-identifying account number, but the subscriber identifier 90 may alternately or additionally be a name, physical street address, communications address (e.g., email, Internet Protocol, telephone number). However the subscriber identifier 90 is received or identified, the server-side security application 84 may then assign a human or computerized agent 92.

Figure 4:
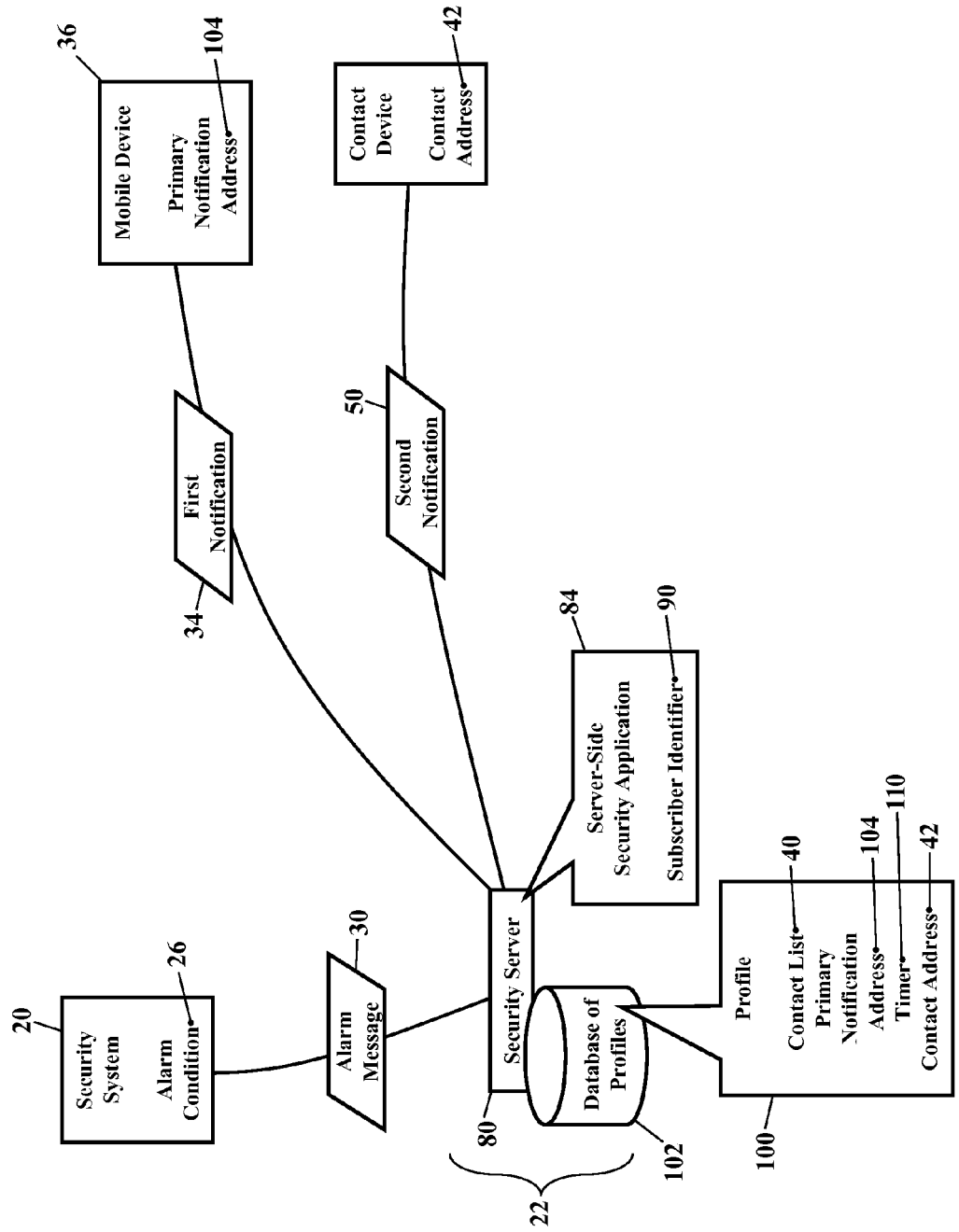
FIG. 4 is a detailed schematic illustrating electronic notifications, according to exemplary embodiments.

FIG. 4 is a detailed schematic illustrating electronic notifications, according to exemplary embodiments. Here the security server 80 sends notifications when alarms are detected. As FIG. 4 illustrates, the security server 80 may retrieve a profile 100 associated with the security system 20. The profile 100 may store preferences, conditions, and/or the contact lists 40 specified by a subscriber of the security system 20. The server-side security application 84, for example, queries a database 102 of profiles for the subscriber identifier 90 associated with the security system 20. The database 102 of profiles returns the profile 100 associated with the subscriber identifier 90.

A primary notification address 104 is then obtained. The primary notification address 104 is any phone number, email address, Internet Protocol address, or other communications address to which the first notification 34 is sent. The primary notification address 104 may be retrieved from the subscriber's profile 100. FIG. 4, for simplicity, illustrates the security server 80 sending the first notification 34 to the subscriber's mobile device 36 (via the communications network 24 illustrated in FIGS. 1-3).

A timer 110 may then be initiated. When the first notification 34 is sent, the timer 110 may start incrementing up to, or decrementing down to, a final value. The profile 100 may specify that when the alarm condition 26 is detected, the subscriber only has a limited time to respond. Otherwise, other entities are contacted to resolve the alarm. Some alarms may be critical and thus require immediate resolution. For example, if a temperature sensor has a high output, heat from a fire may be detected. A water sensor may indicate a flooding basement. The profile 100, then, may be configured to establish the timer 110 when the first notification 34 is sent. As the security server 80 awaits a response to the first notification 34, the timer 110 counts up/down to the final value.

If no response is received, then more notifications may be sent. When the timer 110 expires without a response from the primary notification address 104, the profile 100 may require that additional notifications be sent to other people or entities. The server-side security application 84, for example, queries the profile 100 for the contact list 40. The contact list 40 specifies the one or more contact addresses 42 which are also notified of the alarm message 30 sent by the subscriber's security system 20. Each contact address 42 may be a phone number, an email address, an Internet Protocol address, or any other communications address which is notified of the alarm condition 26. When the timer 110 expires without a response from the primary notification address 104, the server-side security application 84 causes the security server 80 to send the second notification 50 to any contact address 42 in the contact list 40. The profile 100 may even require that one or more contact addresses 42 have priority and be notified before lesser-ranking addresses. The profile 100 may also require that certain contact addresses 42 are notified based on the alarm condition 26. The profile 100, for example, may store a table that maps or associates different alarm conditions 26 to different contact addresses 42. Once the alarm condition 26 is known (from the alarm message 30), the server-side security application 84 queries the profile 100 and retrieves the contact address(es) 42 associated with the alarm condition(s) 26. Regardless, the second notification 50 is sent to a contact address 42 specified in the profile 100.

Figure 5:
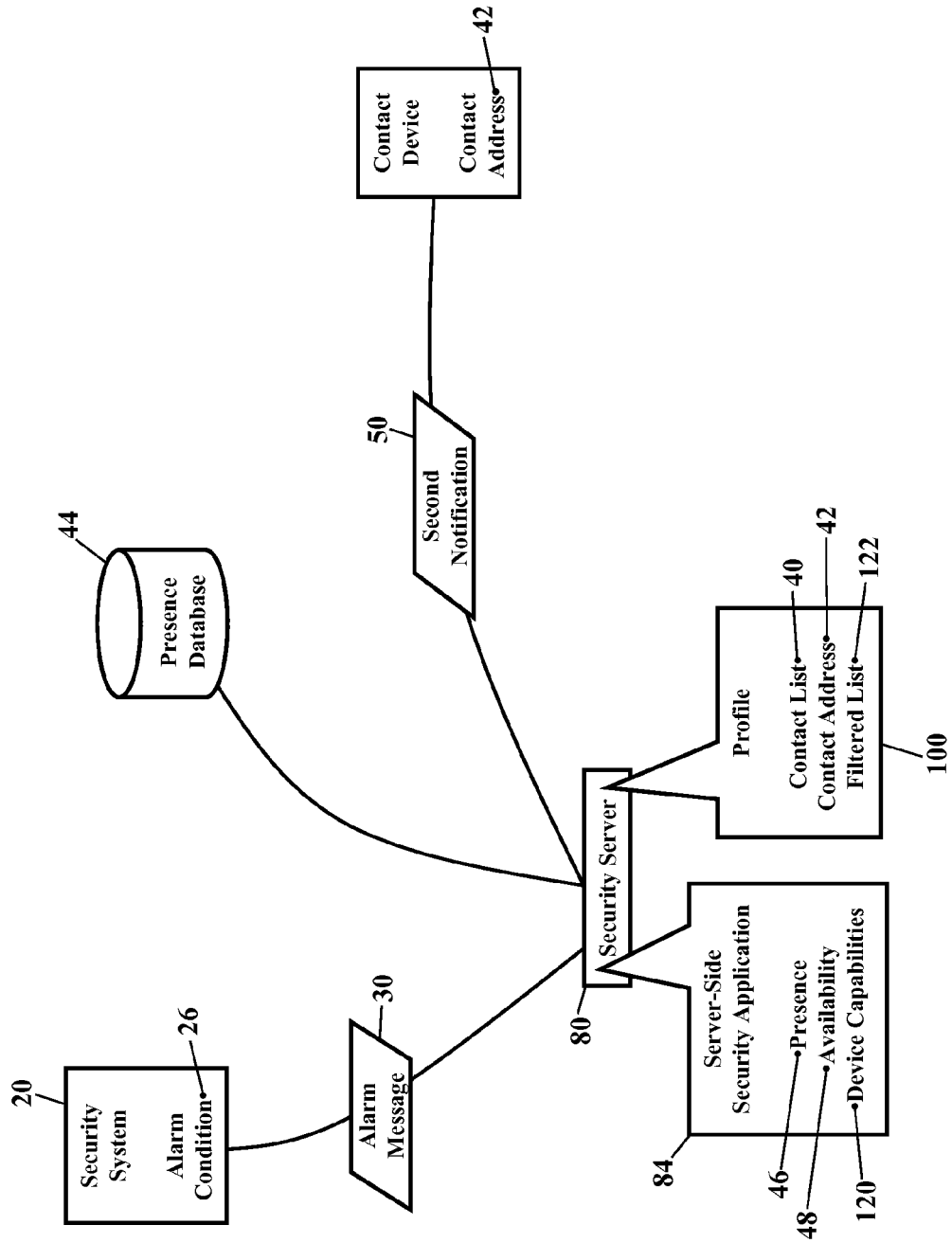
FIG. 5 is a schematic illustrating a presence database, according to exemplary embodiments.

FIG. 5 is a schematic illustrating the presence database 44, according to exemplary embodiments. Here the security server 80 may first determine the presence 46 and the availability 48 before sending any notification. After the server-side security application 84 retrieves the contact list 40 from the profile 100, the server-side security application 84 may cause the security server 80 to query the presence database 44 for any contact address 42 in the contact list 40. The presence database 44 may be remotely located and accessed from some location within the communications network 24, and/or the presence database 44 may be locally stored and accessed in the memory 86 of the security server 80. Regardless, the presence database 44 stores presence and availability information for any contact address 42 specified in the contact list 40. The security server 80 queries the presence database 44 for the presence 46 and availability 48 of any contact address 42 in the contact list 40.

The presence database 44 stores presence and availability information. When a device at the contact address 42 is in communication with, or reachable by, the communications network (illustrated as reference numeral 24 in FIG. 1), then the presence database 44 stores information indicating the contact address 42 is present to the online world. The presence database 44, however, may also store availability information for the same contact address 42. Even though the contact address 42 may be present to the online world, the contact address 42 may be unavailable to receive notifications. Moreover, the contact address 42 may only have device capabilities 120 to receive certain types of communications and formatting requirements. If the contact address 42 can only receive plain old telephone calls, for example, then emails and other electronic communications may be ineffective. The profile 100 may even specify what types of notifications should be sent to each contact address 42 in the contact list 40, so the presence database 44 may provide a real-time view of presence and availability information for each contact address 42 in the contact list 40. The presence database 44 may even include social context information, including a recipient's mood and willingness to communicate. The device capabilities 120 may describe the service/connection capability of the recipient's device, any ability to support various forms of communication (e.g., high-definition voice, video calling, Internet telephony, instant messaging, multimedia messaging, and short messaging). The parameters supporting these functions, and values for the parameters, may be provided by a variety of both explicit and implicit sources. Presence databases are well-known and commercially available, so this disclosure need not further explain presence and availability.

The presence database 44 helps prevent futile notifications. When the contact list 40 is retrieved, the security server 80 may query the presence database 44 for each contact address 42 in the contact list 40. The security server 80 retrieves the presence 46 and availability 48 of each contact address 42 in the contact list 40. The server-side security application 84 may then filter the contact addresses 42 to remove those not present or not available to receive notifications.

As FIG. 5 illustrates, subsequent notifications may then be sent. The server-side security application 84 filters the contact addresses 42 to remove those addresses not present or available to receive notifications. The server-side security application 84 thus stores a filtered list 122 of contact addresses, with each contact address 42 having a current presence and availability to receive notifications. The server-side security application 84 causes the security server 80 to send the second notification 50 to any contact address 42 in the filtered list 122 of contact addresses. The profile 100 may further require that the filtered list 122 of contact addresses be ranked and sequentially or successively attempted. Regardless, the second notification 50 is sent to any contact addresses 42 specified in the filtered list 122 of contact addresses.

Figure 6:
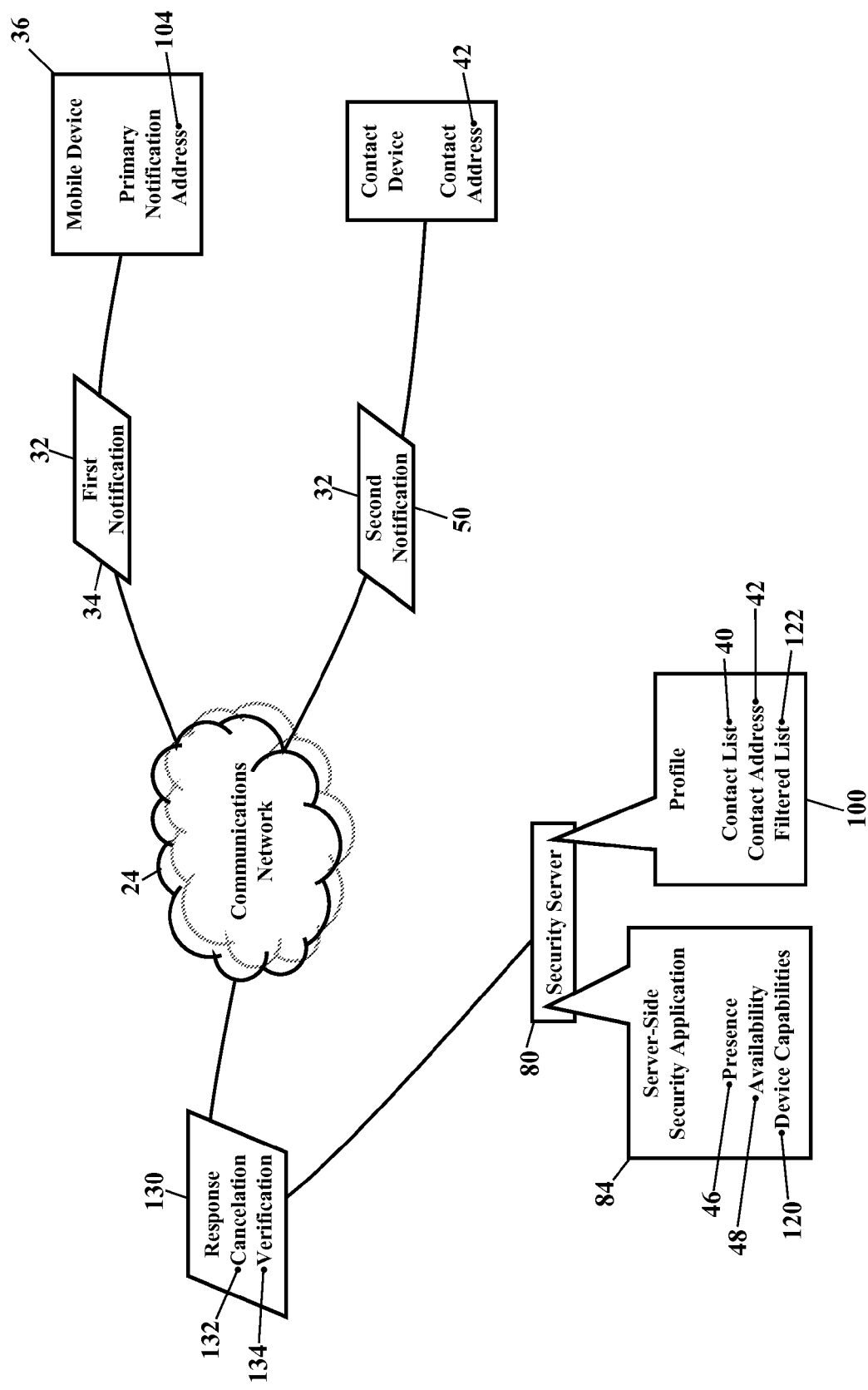
FIG. 6 is a schematic illustrating remote resolution of alarms, according to exemplary embodiments.

FIG. 6 is a schematic illustrating remote resolution of alarms, according to exemplary embodiments. When any notification 32 is sent, the notification 32 may grant a recipient an authority to remotely resolve the alarm detected by the security system 20. The notification 32, for example, may include a website link to video and/or audio data to verify some person detected in the home or business. Because a high percentage of alarms are "false" (such as when an occupant opens a door and accidentally triggers the alarm), the recipient may view any video and/or audio data and first verify that the alarm is legitimate. The notification 32 may additionally or alternatively include a still image captured by a security camera, and the recipient may quickly verify the alarm. A picture of a pet roaming the house, for example, may be quickly dismissed. Any notification 32, then, may grant the recipient the authority to remotely resolve the alarm detected by the security system 20. This feature helps prevent unnecessary calls to emergency services, who may impose fees for unnecessary dispatches.

FIG. 6, then, illustrates remote resolution of alarms. When the first notification 34 is sent to the primary notification address 104 (such as subscriber's mobile device 36), the first notification 34 may grant authority to remotely resolve the alarm detected by the security system 20. If no response is received, then the security server 80 may send the second notification 50 to any contact addresses 42 specified in the subscriber's contact list 40 (or the filtered list 122 of contact addresses, as explained above). The second notification 50 may include options to cancel or verify the alarm detected by the security system 20.

A response 130 is then received. When the response 130 is received from the primary notification address 104, or any contact address 42, then the server-side security application 84 may also receive a cancelation 132 or verification 134 of the alarm. If the recipient canceled the alarm, then the server-side security application 84 implements software code to cancel the alarm. When, however, the recipient verifies the alarm, then the server-side security application 84 implements software code to contact emergency authorities, as is known.

Figure 7:
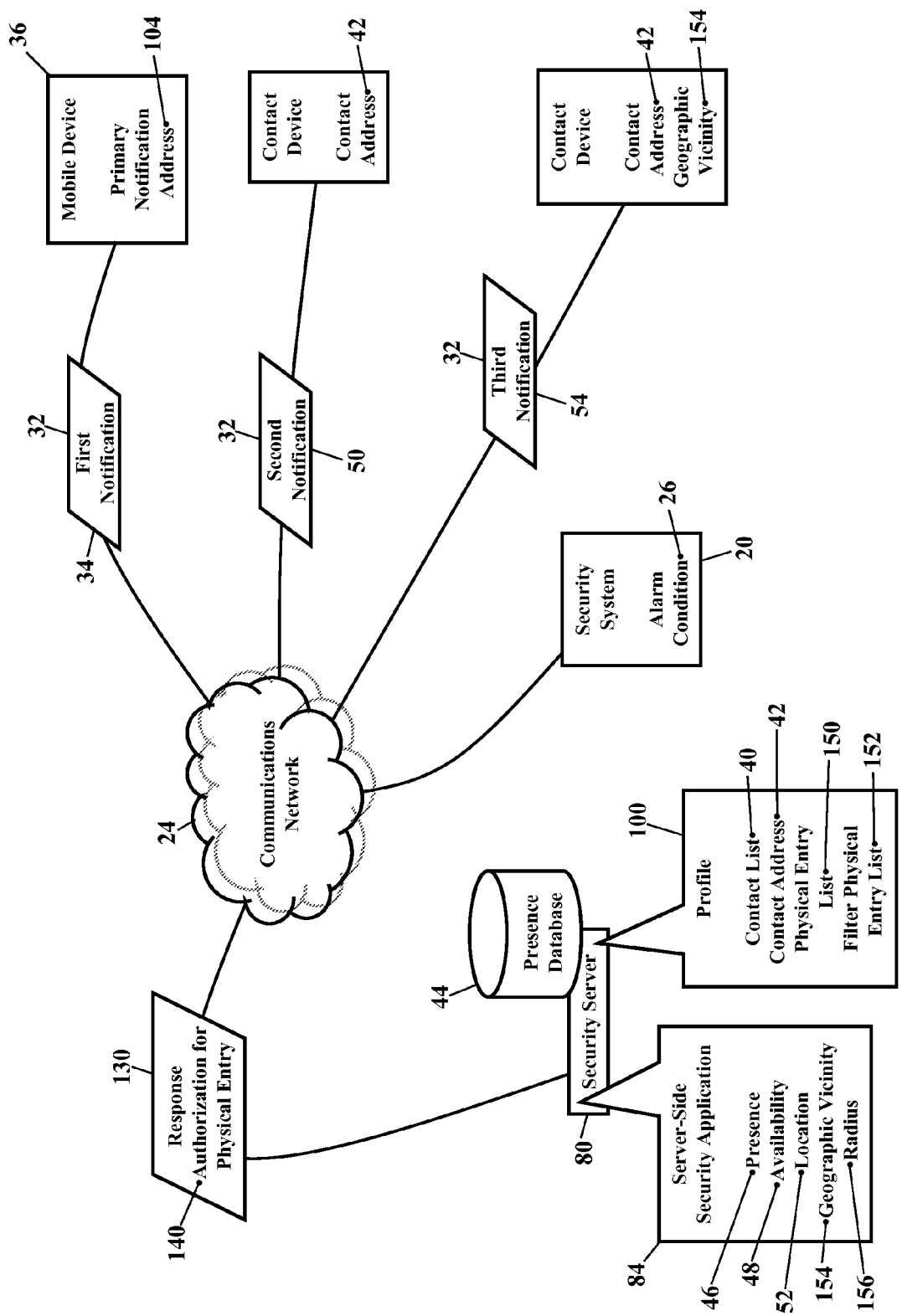
FIG. 7 is a schematic illustrating features for physical entry, according to exemplary embodiments.

FIG. 7 is a schematic illustrating features for physical entry, according to exemplary embodiments. When the security server 80 receives the alarm condition 26, physical entry may be required to resolve the alarm. A water heater may need repair, an HVAC system filter may need changing, or an oven may need to be turned off. Whatever the reason, physical entry may be required to resolve the alarm. Here, then, exemplary embodiments may include features for providing access to the subscriber's home or business.

Physical entry is first determined. When the response 130 is received from the primary notification address 104, or from any contact address 42, the recipient may have authorized physical entry 140 to resolve the alarm. The first notification 34 and/or the second notification 50 may describe the alarm condition 26, thus allowing the recipient to assess the alarm and whether physical entry is required. The recipient may thus send the response 130 and include authorization 140 for physical entry to resolve the alarm.

Physical entry may also determined based on the alarm. When the alarm condition 26 is received, the security server 80 may query the profile 100. The profile 100 may store alarm conditions 26 for which physical entry is required. The subscribing homeowner or business may configure their profile 100 to specify physical entry for particular alarm conditions 26. The profile 100, for example, may store a table that maps, relates, or associates the alarm conditions 26 to physical entry. The server-side security application 84 queries the profile 100 for the alarm condition 26. The profile 100 consults the table and determines whether the authorization 140 for physical entry is granted for the alarm condition 26.

As FIG. 7 illustrates, though, not all contact addresses 42 may be permitted physical entry. Some friends may be trusted to physically enter the subscriber's home or business, while other friends may not be trusted. The subscriber's profile 100, then, may be configured with the contact addresses 42 who are authorized for physical entry. When the server-side security application 84 retrieves the contact list 40 from the profile 100, the server-side security application 84 may first filter the contact addresses 42 to remove those addresses not authorized for physical entry. The server-side security application 84 thus stores a physical entry list 150 of contact addresses, with each contact address 42 in the physical entry list 150 having authority to physically enter the subscriber's home or business.

Exemplary embodiments may then consult the presence database 44. Once the physical entry list 150 of contact addresses is determined, the server-side security application 84 may then determine the presence 46 and availability 48 for each contact address 42. The server-side security application 84 causes the security server 80 to query the presence database 44 for each contact address 42 in the physical entry list 150 of contact addresses. The security server 80 queries the presence database 44 for the real-time (or near real-time) presence 46 and availability 48 of any contact address 42 in the physical entry list 150 of contact addresses. The security server 80 retrieves the presence 46 and availability 48 and filters out or removes any contact addresses 42 not present or available to receive notifications 32. The server-side security application 84 thus stores a filtered physical entry list 152 of contact addresses, with each contact address 42 having a current presence 46 and availability 48 to receive the notifications 32.

Exemplary embodiments may then select based on the location 52. Because physical entry is required, the server-side security application 84 may determine the current geographic location 52 of each contact address 42 in the filtered physical entry list 152 of contact addresses. The server-side security application 84 may then notify any contact address 42 that is present, available, and geographically close to the subscriber's home or business. Some presence databases combine a device's location data with the presence 46 and availability 48, so the server-side security application 84 may simply query the presence database 44 for location data. Combined presence and location databases are commercially available, so FIG. 7 illustrates this combined database. Location data, however, may be obtained from a separate location database in a separate server.

Exemplary embodiments may then select the closest contact address 42. The presence database 44, for example, may be queried for a physical street address associated with the security system 20. Because physical entry is required, the server-side security application 84 may query for the contact address 42 having the current location 52 in a geographic vicinity 154 of the security system 20. The geographic vicinity 154 may be defined as a radius 156 about the physical street address associated with the security system 20. The radius 156 may be specified as distance (e.g., miles or kilometers) or as coordinates (such as global positioning system coordinates). The geographic vicinity 154, however, may additionally or alternatively specified as cellular towers or access points. Exemplary embodiments may select the contact address 42 communicating with a cellular tower, or network access point, nearest the physical street address associated with the security system 20. Exemplary embodiments may thus select the contact address 42 having the current location 52 in the geographic vicinity 154 of the security system 20.

The notifications 32 are then sent. As FIG. 7 illustrates, the third notification 54 is sent to the closest contact address 42 in the geographic vicinity 154 of the security system 20. The third notification 54 provides instructions for physically entering the home or business and resolving the alarm condition 26. If more than one contact address 42 is in the geographic vicinity 154 of the security system 20, then exemplary embodiments may broadcast the third notification 54 to each contact address 42. The profile 100, however, may specify that some contact addresses 42 are preferred and first tried over lesser-ranking addresses. If no response is received, exemplary embodiments may successively try next-closest contact addresses 42. If no contact address 42 responds having the current location 52 in the geographic vicinity 154 of the security system 20, then the radius 156 may be enlarged to capture more locations of additional contact addresses 42. When a maximum radius 156 is attempted without a response, exemplary embodiments may then contact police or fire.

Figure 8:
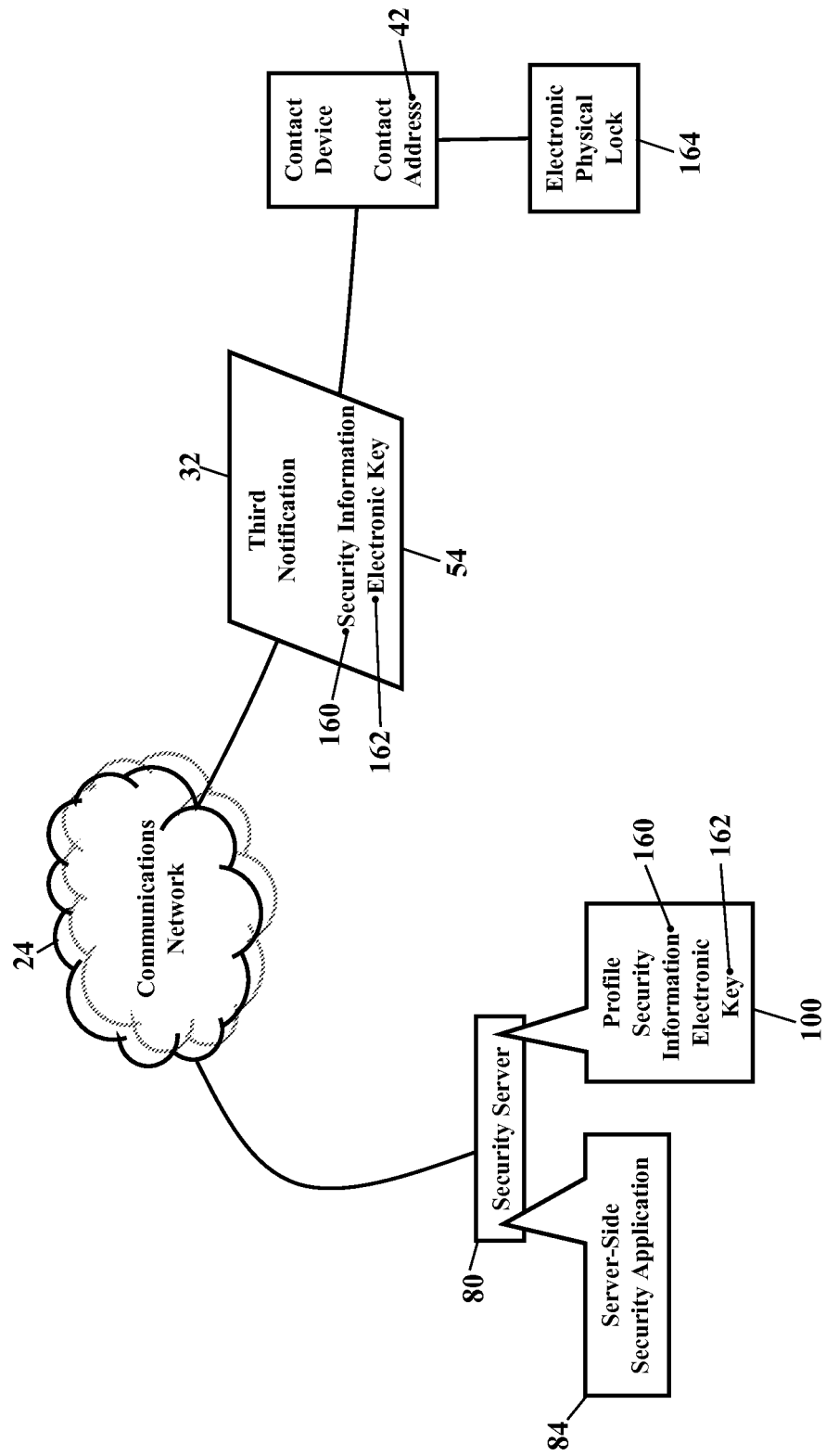
FIG. 8 is another schematic illustrating features for physical entry, according to exemplary embodiments.

FIG. 8 is another schematic illustrating features for physical entry, according to exemplary embodiments. Here any electronic notification (such as the third notification 54) may include security information 160 for physically accessing the subscriber's home or business. The third notification 54, for example, may include information describing an electronic key 162 that allows physical entry into the subscriber's home or business. The electronic key 162 is retrieved from the subscriber's profile 100. The electronic key 162, for example, is an access code, password, or any other security information 160 for unlocking an electronic physical lock 164 in the subscriber's home or business. The recipient may then travel to the subscriber's home or business, enter the electronic key 162 into the electronic physical lock 164, and gain physical access to resolve the alarm. The security information 160, however, may be simpler, such as merely a location in a yard where a spare physical key is hidden.

Figure 9:
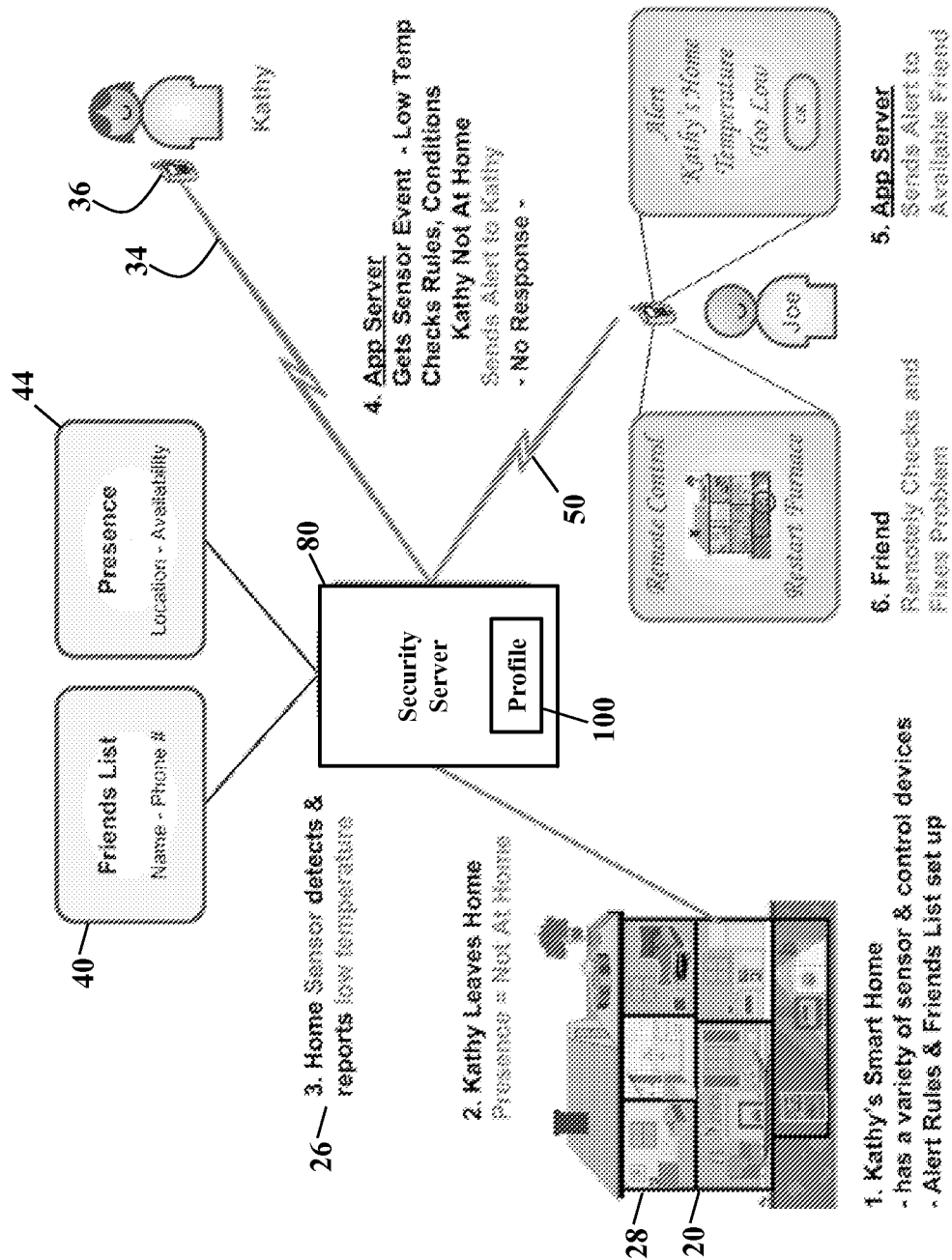
FIG. 9 is a schematic illustrating a temperature alert, according to exemplary embodiments.

FIG. 9 is a schematic illustrating a temperature alert, according to exemplary embodiments. Here, "Kathy" is a smart home user who has configured her profile 100 to alert of critical alarms detected by her residential security system 20. Suppose Kathy's profile 100 requires remote notification when a temperature sensor in Kathy's home detects and reports a temperature below some minimum value (i.e., 40 degrees). When the security system 20 detects the alarm condition 26 from a temperature sensor 28, the security system 20 notifies the sends the alarm message 30 to the security server 80. The security server 80 may first check Kathy's profile 100 to determine if notification is desired. Because Kathy has configured her profile 100 to require remote notification, the security server 80 may query the presence database 44 for Kathy's current presence 46 and availability 48. The presence database 44 tracks or logs Kathy's presence information, and her presence information may be included among the conditions the security server 80 uses when determining if remote notification is taken. If Kathy's presence 46 indicates she is at home, then the notification 34 is sent to some communications address associated with her home. If Kathy's presence 46 is not associated with her home, the security server 80 may, instead, send the first notification 34 to Kathy's mobile device 36 (such as her smart phone or personal data assistant).

Regardless, if Kathy fails to respond, her friends may be notified. Suppose also that Kathy's profile 100 has enabled an Alert-a-Friend service. This service alerts Kathy's trusted friends if she fails to respond to remote notification. As the earlier paragraphs explained, Kathy's profile 100 may specify that she only has a limited time to respond (Kathy may configure her profile 100 to wait any amount of time). The security server 80 initializes the timer (illustrated as reference numeral 110 in FIG. 4) and awaits her response. If Kathy fails to respond by the final value of the timer 110, then the security server 80 retrieves her contact list 40 (e.g., Kathy's "Friends List"). The contact list 40 contains the names and/or addresses of friends that Kathy has authorized to remotely resolve alarms detected by her security system 20 (note that when Kathy established her contact list 40, each friend in the contact list 40 may have been sent an "opt in" message that explained the Alert-a-Friend service and obtained their agreement).

The security server 80 then sends the second notification 50 to her friends. The second notification 50 may be sent and formatted to suit the capabilities of any device. The second notification 50, for example, may be an electronic alert or message to a smart cell phone capable of running an application specific client in a background mode. This capability enables the smart cell phone to interrupt any currently running application and to provide a high priority alert. Kathy's friends who opt in to the Alert-a-Friend service may be required to download the client-side security application (illustrated as reference numeral 70 in FIG. 2) during an opt-in procedure (commonly used over the air). The second notification 50, however, may be an email or text message (Short Message Service). The second notification 50, though, may also be a network-initiated voice call with a synthesized speech message that is customized for the specific alert. Interactive Voice Recognition (IVR) may be used to interact with Kathy's friend.

The security server 80 may also query the presence database 44 for Kathy's friends. As earlier paragraphs explained, the presence database 44 stores the presence 46 and availability 48 of each contact address 42 in Kathy's contact list 40. The presence database 44 may also know the device capabilities 120 of each friend's device. Kathy's profile 100 may thus require the presence database 44 to determine if a friend is at home, which friends are available, their location, and the device capabilities 120 of their communication devices. The security server 80 may thus send the second notification 50 to any contact address 42 in the contact list 40 that is available to receive electronic notifications. The second notification 50 allows a user at the contact address 42 to remotely resolve the alarm condition 26, such as electronically canceling or resetting the alarm condition 26 detected by the security system 20.

In this example, Kathy lives in a climate where the ambient temperature may fall below freezing. If Kathy's heating system should malfunction or fail, then water pipes may freeze and burst. This common situation poses significant and expensive problems for homeowners. Kathy's Alert-a-Friend service, though, alerts her of low-temperature conditions. Kathy's cell phone receives the first notification 34 describing the alert condition 26. Kathy may thus take immediate action to prevent her home's water pipes from freezing. If, however, Kathy does not quickly respond, the Alert-a-Friend service sends the second notification 50 to Kathy's trusted friends specified in her contact list 40. The second notification 50 grants her friend access to Kathy's smart home capabilities, thus allowing the friend to remotely resolve the alarm. If Kathy's heating system malfunctioned due to a power outage, any of her trusted friends may be granted permission to re-activate the heating system. Kathy's friend may thus restore Kathy's heating system, using the friend's communications device, to reduce the risk of freezing pipes.

Exemplary embodiments thus provide additional security to subscribers. Even though Kathy did not respond, her mobile device 36 may display the first notification 34 and also indicate that one of her friends resolved the alarm condition 26. Exemplary embodiments thus relieve users of potential anxiety regarding the safety of their home or business. Exemplary embodiments also provide psychological security, prompting users to subscribe even if rarely used.

Figure 10:
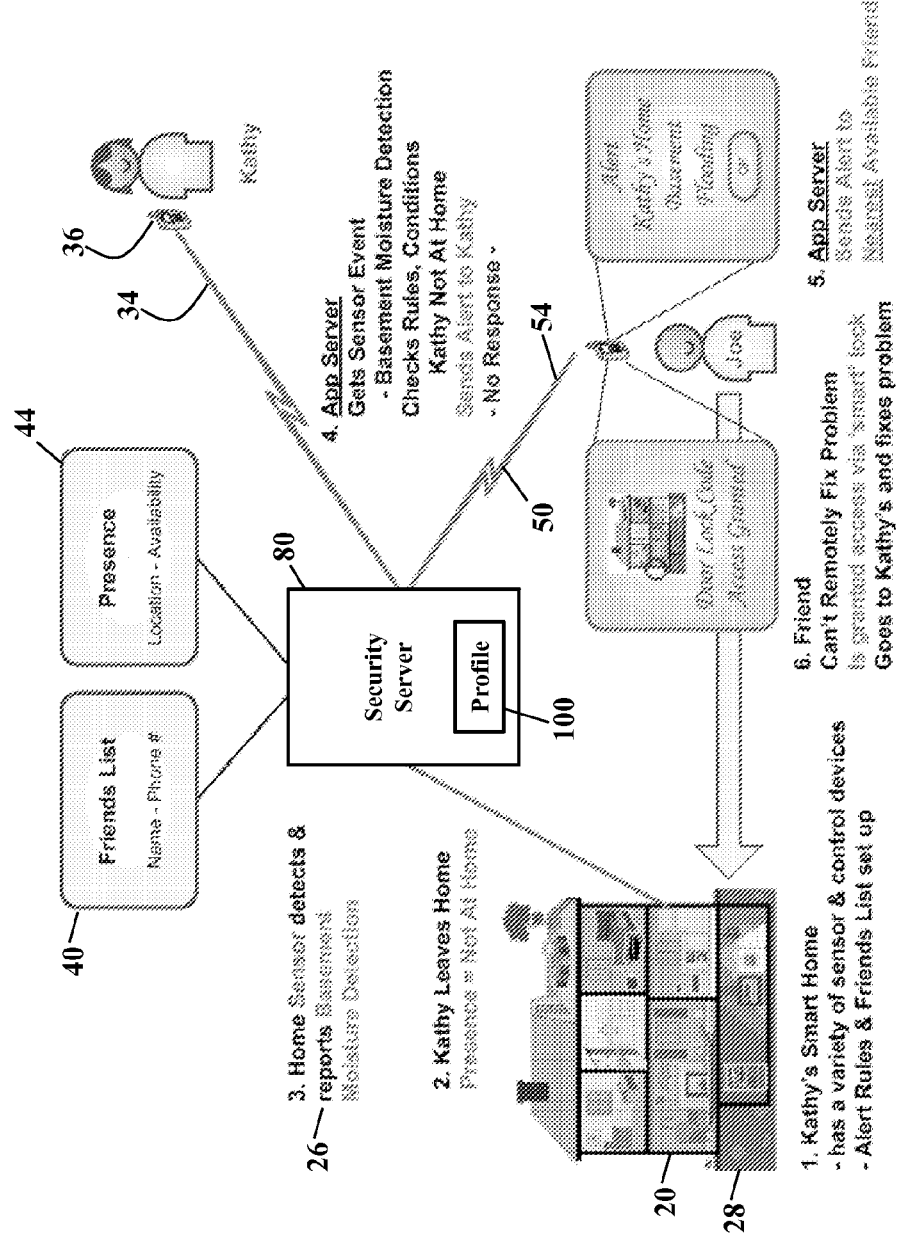
FIG. 10 is a schematic illustrating a flood alert, according to exemplary embodiments.

FIG. 10 is a schematic illustrating a flood alert, according to exemplary embodiments. Here, though, physical entry into Kathy's home is required to resolve a flooded basement. Suppose Kathy's basement has a sump pump to help prevent flooding of her basement. Kathy's smart home also has a moisture sensor 28 positioned to detect if a water level becomes too high, indicating the sump pump has failed. When the security system 20 detects the alarm condition 26 from the moisture sensor 28, the security system 20 notifies the security server 80. Because Kathy's profile 100 requires remote notification, the security server 80 sends the first notification 34 to Kathy's mobile device 36. The security server 80 initializes the timer 110 and awaits her response. Even though Kathy fails to respond, she has enabled the Alert-a-Friend service. The security server 80 retrieves her contact list 40 and sends the second notification 50 to her friends. The security server 80 may further query the presence database 44 to determine the presence 46 and availability 48 of each contact address 42 in Kathy's contact list 40. Regardless, the second notification 50 grants Kathy's friend permission to remotely resolve the alarm condition 26.

Here, though, physical entry is required. Even though one of Kathy's friends is granted authority to remotely resolve the alarm condition 26, Kathy's failed sump pump cannot be remotely resolved. Physical entry is thus required to repair or replace the sump pump. The security server 80 determines which of Kathy's friends are approved for physical entry into her home (as illustrated and explained with reference to FIG. 7). The security server 80 may then consult the presence database 44 to notify the contact address 42 that is present, available, and geographically closest to Kathy's home (again as illustrated and explained with reference to FIG. 7). The third notification 54 may then sent to the closest contact address 42 in the geographic vicinity 154 of Kathy's home (e.g., the security system 20). The third notification 54 may also include the security information 160 for physically accessing Kathy's home (as illustrated and explained with reference to FIG. 8).

Kathy's friend is thus granted physical access to Kathy's home. In this example, Kathy's home has the electronic smart lock 164 that can be wirelessly and/or remotely activated (such as by a cell phone), or the electronic smart lock 164 can be opened by entering the electronic key 162 on a combination in a keypad. The third notification 54 may thus provide Kathy's friend with a temporary access code that can be used to open the lock. Kathy's friend inputs the security information 160, gains physical entry, and enters Kathy's basement. Kathy's friend may thus diagnose and repair the failed sump pump. At some point the security server 80 may then delete the security information 160 to prevent others from obtaining physical entry.

Figure 11:
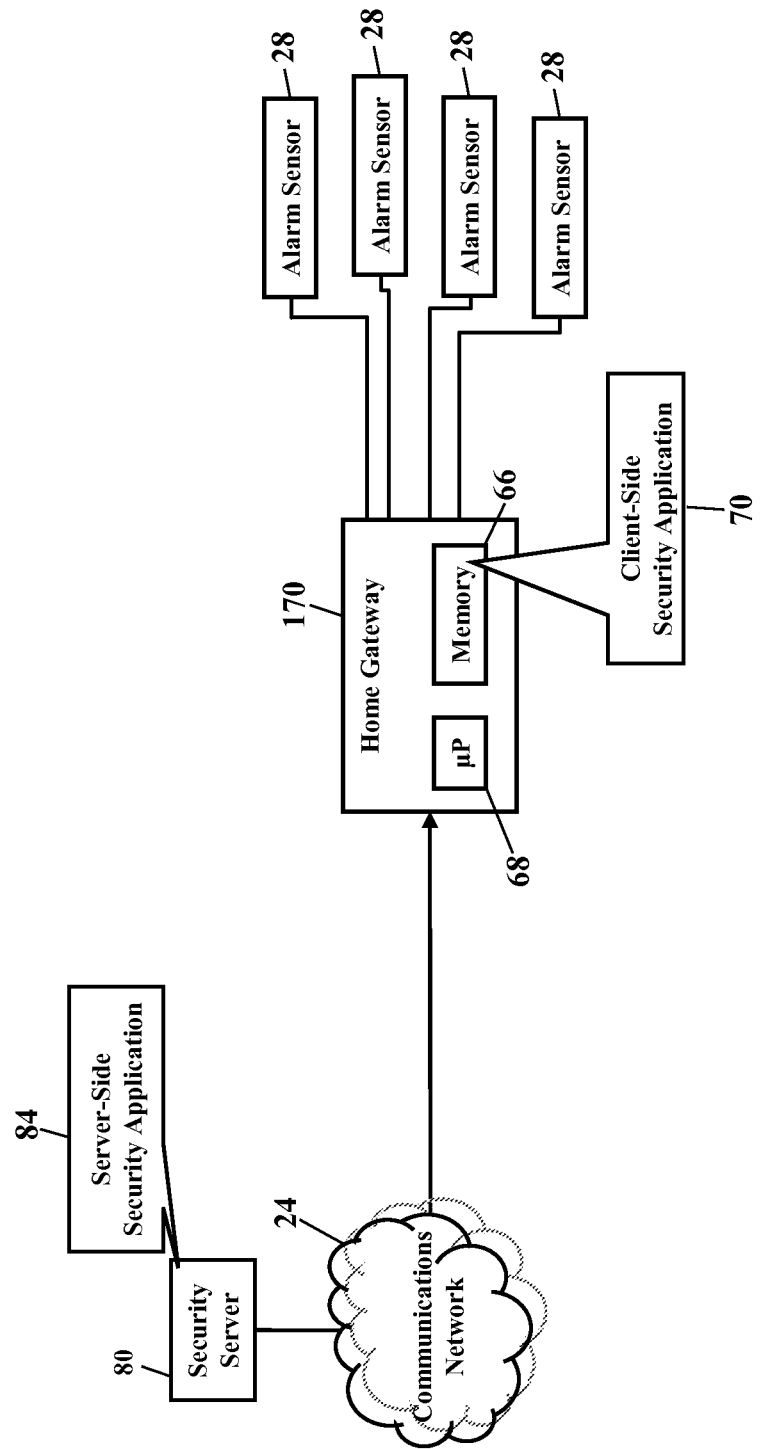
FIGS. 11 & 12 are schematics illustrating a home gateway, according to exemplary embodiments.

FIG. 11 is a schematic illustrating a home gateway 170, according to exemplary embodiments. Here the home gateway 170 receives and/or aggregates events/conditions detected by the alarm sensors 28. The alarm sensors 28 may connect to the home gateway 170 using any proprietary or standardized interface (e.g., wired, Ethernet, wireless, ZIG-BEE®, Z-wave, BLUETOOTH®, WLAN). The home gateway 170 may support a diversity of interfaces and protocols to the alarm sensors 28 and then provide a common interface from the home gateway 170 to the security server 80. The home gateway 170 may be connected to a service provider's core network using any proprietary or standardized wired (e.g. Ethernet) and/or wireless method (e.g., GSM, GPRS, UMTS, LTE).

The home gateway 170 may have a sensor aggregation function. The home gateway 170 may thus relay events/conditions to the security server 80, or the home gateway 170 may provide intelligence to reduce signaling. For example, in the previously described examples, Kathy's security system 20 may have a ZIGBEE® radio-based temperature sensor that detects one or more temperatures. The home gateway 170 may execute the client-side security application 70 to detect when a temperature has crossed a threshold value. The alarm sensor 28, for example, may be intelligent, know the threshold, and report if the threshold is crossed. The user could input the threshold value directly using an interface on the alarm sensor 28, and/or the user could input the threshold value on a device connected to the home gateway 170, and the data is downloaded to the alarm sensor 28. When the home gateway 170 receives the event, the home gateway 170 relays the data to the security server 80. The alarm sensor 28 may periodically report the temperature to client-side security application 70, and the client-side security application 70 may determine if the threshold is crossed and, if so, provide data to the security server 80. The user may input the threshold value on a device connected to the home gateway 170, and the alarm sensor 28 may periodically report the temperature to the home gateway 170, which relays it to the security server 80. The server-side security application 84 may then determine if the user-provided threshold is crossed. The home gateway 170 may provide a data relay function, where the home gateway 170 periodically polls the alarm sensor 28 for data, determines if the threshold has been crossed, and if so sends data to the server-side security application 84.

Any alarm sensors 28 may be used. While the above paragraphs describe sensors in homes and businesses, any sensor in any location may be used. The alarm sensors 28, for example, may be located in automobiles, planes, boats, and any other mobile or fixed location. Notifications may be sent if engine oil is low, windows are open, doors are open or unlocked, or intrusion is detected. The Alert-a-Friend service may thus be expanded to include any location or environment that may be monitored.

Figure 12:
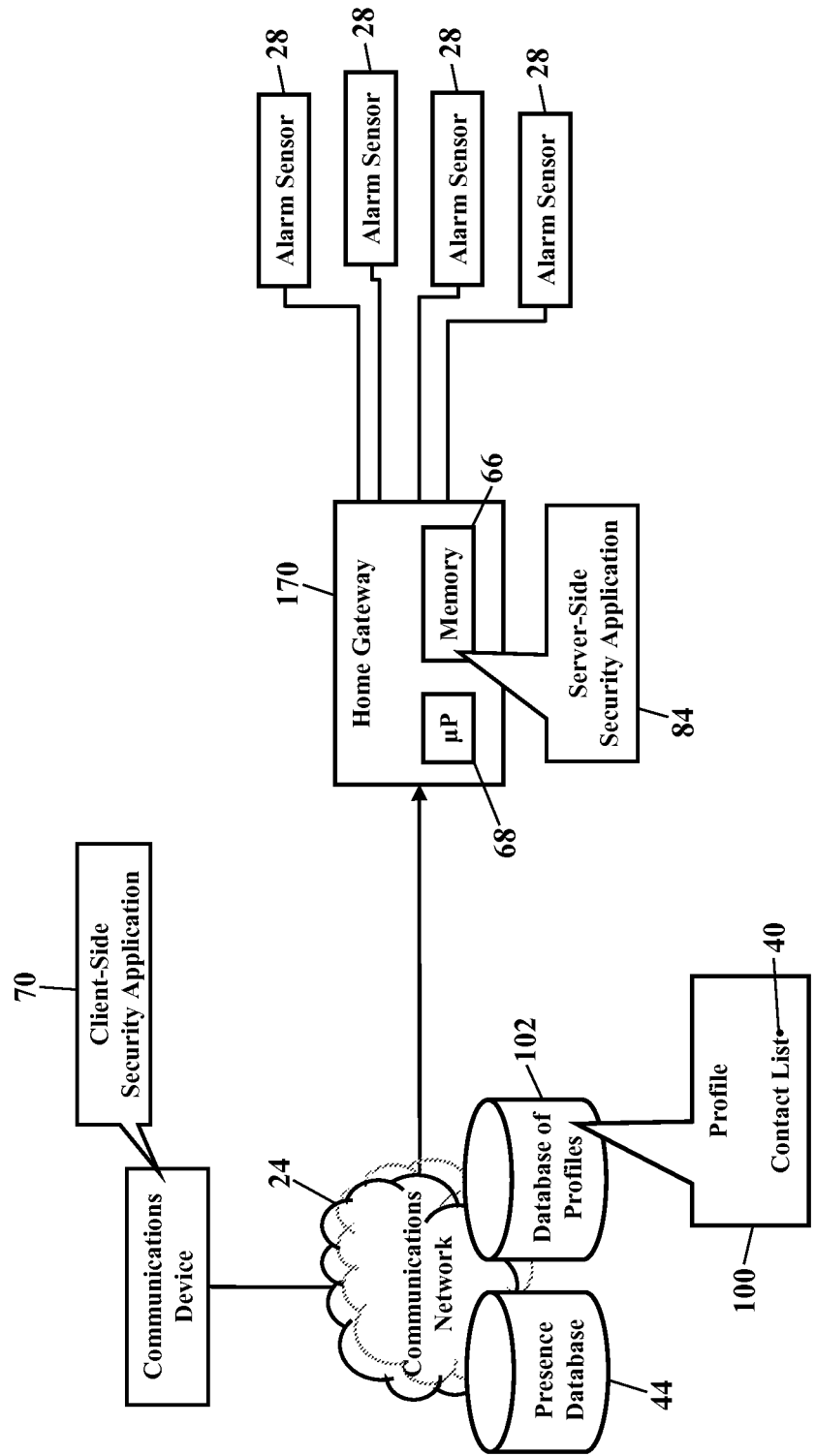

FIG. 12 is another schematic illustrating the home gateway 170, according to exemplary embodiments. Here the home gateway 170 executes some or all of the server-side security application 84. The home gateway 170 may thus perform some or all of the above-described functions of the security server 80, albeit in the home gateway 170. The home gateway 170 may thus have a client-server relationship with the client-side security application 70 operating in any communications device. While the security server 80 operating in a service provider's core network is preferable, FIG. 12 illustrates that the home gateway 170 may function as part of a smart home ecosystem.

Regardless, the presence database 44 is preferably in service provider's core network. A core network-based presence database 44 can readily have knowledge of the presence 46 and availability 48 of a large number of users in a centralized location, using a diversity of presence sensing methods. The server-side security application 84 may thus obtain the needed presence 46, availability 48, and device capabilities 120 with minimal signaling interaction and complexity. Moreover, the server-side security application 84 may receive a device's presence 46, availability 48, and device capabilities 120 on a single shot basis by setting the subscription to be a one-shot request by setting a time length=zero (0). Thus the server-side security application 84 may get information on demand rather than pushing information when wanted (e.g., every time information changes).

Presence may alternatively be obtained directly from devices. When a device's presence 46, availability 48, and device capabilities 120 are needed, exemplary embodiments may query a friend's device for the information. This alternative approach may involve more signaling complexity, and a device may not have knowledge of its location. Indeed, many devices may not utilize the rich diversity of location methods available and may not support the needed signaling for location determination. As such, the centralized presence database 44 is preferably in the service provider's core network.

The user's contact list 40 may also be preferably centrally located in the service provider's core network. The user's contact list 40 identifies friends who should be contacted in case the user does not respond to a critical notification. This functionality can be provided by a standards compliant core network-based XML Document Management Server (XDM Server) with a standardized XCAP interface (an IETF defined HTTP based protocol that enables XML supported document management). Alternatively, the contact list 40 could be provided using a proprietary management method. The user's contact list 40, however, may be implemented using any database scheme.

As FIGS. 1-8 illustrate, though, the server-side security application 84 is also preferably centrally located in the service provider's core network. The security server 80, executing the server-side security application 84, may thus be generically considered as an application server executing an application. The application server executes instructions, code, and/or logical statements to provide the Alert-a-Friend service. The user's profile 100 may store user-defined rules for actions to be taken and conditions for each action. The server-side security application 84 may thus pull together the different components to provide a cohesive end to end user service.

The actions of the server-side security application 84 may be event driven. The server-side security application 84 may receive the alarm message 30 describing an event detected by the alarm sensor 28. The server-side security application 84 may then check the user's profile 100 for rules and/or conditions to determine what action should be taken (if any). For example:

IF Temperature <40 degrees
AND Kathy's Presence=Not At Home
THEN Send Alert

In the case of Alert-a-Friend service, additional logic may be provided:

IF Temperature <40 degrees
AND Kathy's Presence=Not At Home
THEN Send Alert
   Start Response Supervision Timer (TimeoutTime)
IF Response Supervision Timer Expires
THEN Alert Friend ; finds nearest available friend
   ; sends Alert, restarts supervision timer Note that the friend may be granted access to the control capabilities of the user's smart home system. The friend may also be granted access to the user's home (as earlier paragraphs explained). The granting of such permissions can be provided on a limited basis, for example, for a limited time duration, or on a one usage only basis.

Exemplary embodiments may support real-time, high priority notifications to users. The notifications 32 are preferably more dynamic (and attention getting) than conventional emails and SMS text messages. The notifications 32 may be application specific, be capable of generating auditory as well as visual alert notification, and be capable of being received even if the user is using a different application at the time. The device capabilities 120, however, may determine the features of any notification 32.

Mobile devices are compelling. In the simplest and perhaps most appealing approach, a service provider could offer this service only to users with devices that support an application specific client (e.g., ANDROID® or IPHONE®). The users could download the client-side security application 70 from an online store, or it could be installed on the user's device by the service provider, for example by being pre-installed at the time the device is purchased, or by a service tech at the service provider's store, or using standardized Over The Air (OTA) methods. If the user's device supports multitasking, the client-side security application 70 may run in the background while the user is using other applications and still receive and provide notifications. So the user could be talking on their phone, or playing a game, or browsing the Internet, and still receive and respond to an incoming alert. Any communication device, however, may be used, such as smart cell phones, legacy cell phones, tablets, netbooks, laptops, PCS, IPTVs, wired phones, and any other processor-controlled device.

The client-side security application 70, however, is not required. Although the optimal user experience may be provided by an application specific client in the user's device, the delivery of alerts does not require the client-side security application 70. For example, for older cell phones that do not support a client, or even wired landline phones that do not have a display, the user could be notified by a network-generated voice call, perhaps combined with dialed digit or voice response recognition. Suppose, for example:

Kathy's friend, Joe, receives an incoming call from "Kathy's Home Alert System;"
   "Hello Joe, this is Kathy's Home Alert System. The temperature in her home has fallen below 40 degrees. Please press 1 if you can investigate, or press 2 if can't help at this time."
   Joe presses 1;
   "Thank you, Joe. Kathy will be informed."

As another example, for a notification sent to an IPTV, a text message could be over laid on the screen, providing the alert information and asking the user for acknowledgement/input.

Note that intelligence may determine the method of notification for each user or device. The most desired approach may be to enable communication to users with smart phones that are capable of supporting an application specific client with dynamic alerting. If the user's cell phone does not support that capability, then a fall back approach could be to provide a network generated voice call. With additional intelligence, if the presence database 44 determines that the user's nearby and available friend is home, exemplary embodiments may push a notification to multiple devices. Notification, for example, may be sent to the friend's wireline phone, IPTV, and cell phone, using different methods as appropriate for the different devices. A response from any device may terminate the notification on all devices.

Figure 13:
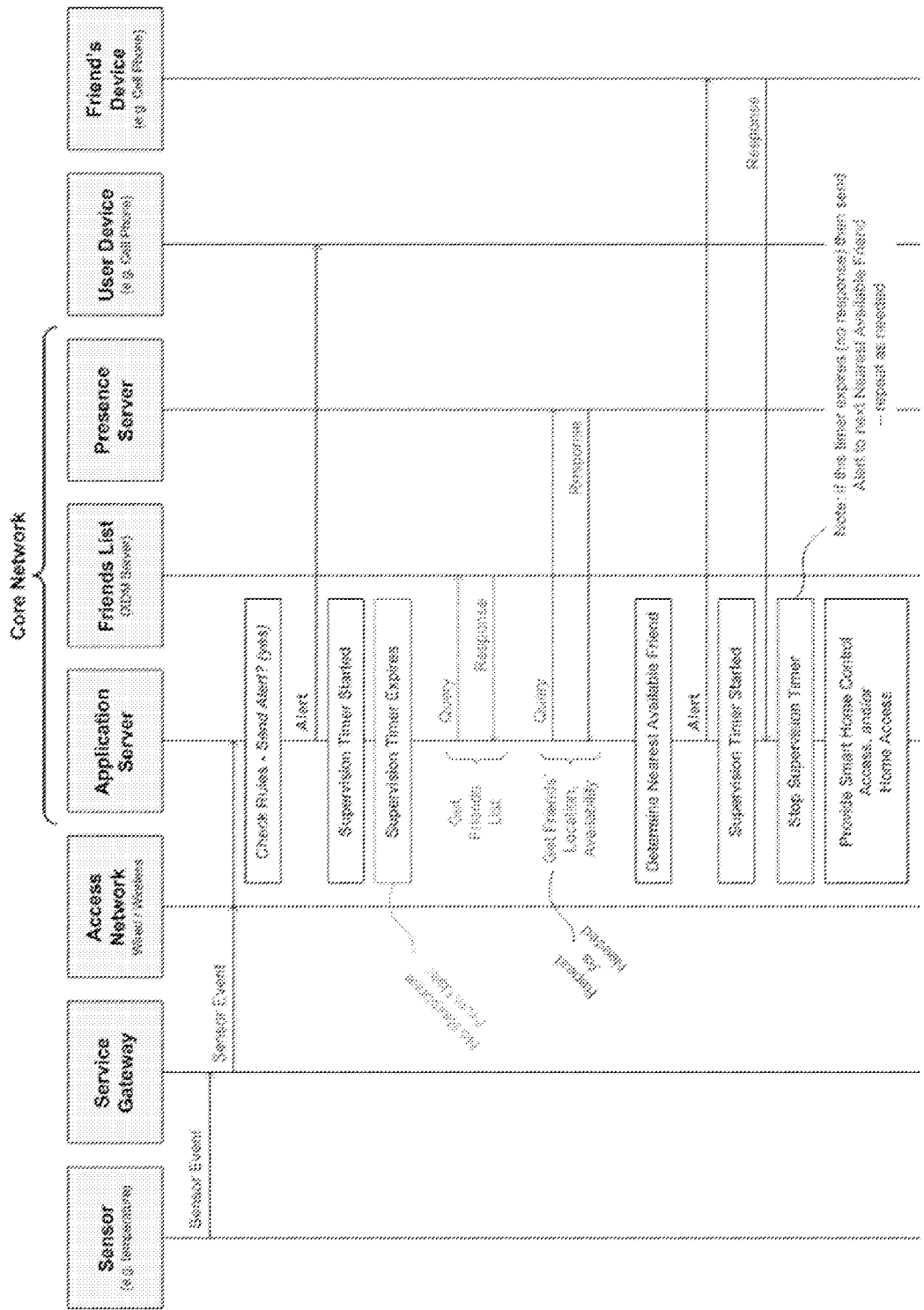
FIG. 13 is a schematic illustrating messaging, according to exemplary embodiments.

FIG. 13 is a schematic illustrating messaging, according to exemplary embodiments. FIG. 13 is a high level message flow diagram that provides an overview of the componentry, logic, and messaging described above.

FIG. 14 is a schematic illustrating still more exemplary embodiments. FIG. 14 is a generic block diagram illustrating the client-side security application 70 and/or the server-side security application 84 may operate within a processor-controlled device 200. The client-side security application 70 and/or the server-side security application 84 may be stored in a memory subsystem of any processor-controlled device 200. One or more processors communicate with the memory subsystem and execute the client-side security application 70 and/or the server-side security application 84. Because the processor-controlled device 200 is well-known to those of ordinary skill in the art, no detailed explanation is needed.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
receiving an alarm message describing an alarm detected by a security system;
associating the security system to a profile;
retrieving a contact list from the profile;
querying a presence database for each contact address in the contact list;
retrieving a location and an availability for each contact address in the contact list;
selecting a contact address in a vicinity of the security system and having the availability to receive an electronic notification;
retrieving a yard location of a physical key for physical entry to resolve the alarm; and
sending the yard location in an electronic notification to the contact address.

2. The method of claim 1, further comprising retrieving a notification address from the profile.

3. The method of claim 2, further comprising sending the electronic notification to the notification address to alert of the alarm.

4. The method of claim 1, further comprising granting authority in the electronic notification for remote resolution of the alarm.

5. The method of claim 1, further comprising retrieving an electronic key from the profile that allows physical entry to resolve the alarm.

6. A system, comprising:
a processor; and
memory storing code that when executed causes the processor to perform operations, the operations comprising:
receiving an alarm message describing an alarm detected by a security system;
retrieving a profile associated with the security system;
determining, from the profile, that the alarm cannot be remotely resolved;
retrieving a notification address from the profile;
sending an electronic notification to the notification address to alert of the alarm;
initializing a timer that counts to a final value;
retrieving a contact list from the profile in response to expiration of the timer without receipt of a response;
querying a presence database for each contact address in the contact list;
retrieving a location and an availability for each contact address in the contact list;
selecting a contact address in a vicinity of the security system and having the availability to receive an electronic notification; and
sending the electronic notification to the contact address to alert of the alarm.

7. The system of claim 6, wherein the operations further comprise including authority in the electronic notification for remote resolution of the alarm.

8. The system of claim 6, wherein the operations further comprise retrieving an electronic key from the profile that allows physical entry to an electronic lock to resolve the alarm.

9. The system of claim 8, wherein the operations further comprise including the electronic key in the electronic notification for the physical entry to resolve the alarm.

10. The system of claim 8, wherein the operations further comprise retrieving a device capability associated with the contact address.

11. The system of claim 10, wherein the operations further comprise determining the contact address is available based on network presence and the device capability.

12. The system of claim 10, wherein the operations further comprise retrieving a set of conditions in response to receipt of the alarm message.

13. The system of claim 12, wherein the operations further comprise querying the set of conditions for the alarm.

14. The system of claim 13, wherein the operations further comprise retrieving a condition associated with the alarm.

15. A memory storing instructions that when executed causes a processor to perform operations the operations comprising:
receiving an alarm message describing an alarm detected by a security system;
retrieving a profile;
retrieving a yard location of a spare physical key that permits physical entry to resolve the alarm;
retrieving a notification address from the profile;
sending the yard location in an electronic notification to the notification address to alert of the alarm;
initializing a timer that counts to a final value;
retrieving a contact list from the profile when no response is received by the final value;
querying a presence database for each contact address in the contact list;
retrieving a location and an availability for each contact address in the contact list;
selecting a contact address in a vicinity of the security system and having the availability to receive an electronic notification; and
sending the electronic notification to the contact address to alert of the alarm.

16. The memory of claim 15, wherein the operations further comprise including authority in the electronic notification for remote resolution of the alarm.

17. The memory of claim 15, wherein the operations further comprise determining the alarm must be resolved by physical entry.

* * * * *